(12) United States Patent
Vogel et al.

(10) Patent No.: US 8,215,572 B2
(45) Date of Patent: Jul. 10, 2012

(54) FUEL INJECTION SYSTEM

(75) Inventors: Manfred Vogel, Ditzingen (DE);
Werner Herden, Gerlingen (DE);
Rainer Ecker, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 1051 days.

(21) Appl. No.: 10/588,181

(22) PCT Filed: Nov. 24, 2004

(86) PCT No.: PCT/DE2004/002604
§ 371 (c)(1),
(2), (4) Date: Nov. 18, 2008

(87) PCT Pub. No.: WO2005/075815
PCT Pub. Date: Aug. 18, 2005

(65) Prior Publication Data
US 2009/0065608 A1  Mar. 12, 2009

(30) Foreign Application Priority Data

Feb. 5, 2004 (DE) .......................... 10 2004 005 727

(51) Int. Cl.
*F02M 61/00* (2006.01)

(52) U.S. Cl. ................ 239/533.12; 239/533.2; 239/559; 239/556; 239/558; 123/299; 123/305

(58) Field of Classification Search ............ 239/533.12, 239/596–599, 601, 533.2; 123/276, 299, 123/301, 467, 305
See application file for complete search history.

(56) References Cited

U.S. PATENT DOCUMENTS

| 1,988,754 | A | * | 1/1935 | Sleffel | 123/260 |
| 4,548,172 | A | * | 10/1985 | Bailey | 123/298 |
| 4,919,093 | A | * | 4/1990 | Hiraki et al. | 123/299 |
| 7,032,566 | B2 | * | 4/2006 | Cavanagh et al. | 123/299 |
| 7,201,334 | B2 | * | 4/2007 | Sasaki et al. | 239/585.5 |

FOREIGN PATENT DOCUMENTS

| DE | 100 26 323 | 11/2001 |
| DE | 100 32 336 | 1/2002 |
| DE | 101 03 050 | 8/2002 |
| DE | 101 16 466 | 10/2002 |
| EP | 1 375 905 | 1/2004 |
| JP | 2003 328759 | 11/2008 |
| WO | WO 02/090763 | 11/2002 |

OTHER PUBLICATIONS

Patent Abstracts of Japan, Bd. 017, No. 465 (M-1468), Aug. 25, 1993 (& JP 05 106442 A (Yanmar Diesel Engine Co., Ltd.), Apr. 27, 1993).

* cited by examiner

*Primary Examiner* — Dinh Q Nguyen
(74) *Attorney, Agent, or Firm* — Kenyon & Kenyon LLP

(57) ABSTRACT

A fuel-injection system for direct injection of fuel into a combustion chamber through a combustion-chamber top arranged opposite a piston has a fuel injector which includes an actuable valve-closure member. The valve-closure member cooperates with a valve-seat surface to form a sealing seat. A multitude of spray-discharge orifices generates a spray cloud, each spray-discharge orifice generating a fuel jet, and the multitude of fuel jets generating the spray cloud in the combustion chamber. A first opening angle of the spray cloud in a first plane is greater than a second opening angle in a second plane extending perpendicular to the first plane.

17 Claims, 3 Drawing Sheets

FUEL INJECTION SYSTEM

FIELD OF THE INVENTION

The present invention relates to a fuel-injection system having a plurality of spray-discharge orifices.

BACKGROUND INFORMATION

Published German Patent document DE 101 03 050 describes a fuel injector having a plurality of spray-discharge orifices. The spray-discharge orifices are disposed in such a way that a fuel envelope which is as uniform as possible towards all sides and which has an identical opening angle toward all sides is generated in the combustion chamber during the injection process.

A particular disadvantage of the fuel injection system known from the aforementioned published German patent document is that, in combustion chambers having a combustion-chamber top that is not rotationally symmetrical, the fuel is distributed with insufficient uniformity.

SUMMARY

The fuel injection system according to the present invention has the advantage over the prior art that the distribution of fuel in combustion chambers, without using rotationally symmetric combustion chamber tops, is able to be implemented in a more uniform manner.

The spray cloud is advantageously formed in such a way that a constant clearance angle between combustion chamber top and spray cloud results in the circumferential extension of the spray cloud, the spray cloud being embodied as "shower head spray" which evenly distributes a multitude of fuel jets into the combustion chamber. This makes it possible to improve the distribution and combustion of the fuel.

In accordance with an example embodiment of the present invention, the fuel injector injects through a combustion chamber top that conically widens in a cross section of the second plane, the combustion chamber top widening at a greater gradient in a cross section of the first plane.

In an advantageous manner, the fuel is at least partially injected into a piston cavity of the piston. This makes it very easy for all or only a portion of the fuel jets to achieve identical clearances of the discharge-side ends of the fuel jets with respect to the wall arranged in the jet direction.

The piston cavity advantageously has at least one projection.

If the projection is advantageously arranged in the center of the piston cavity, it takes little effort to inject the fuel jets in a manner that, when their jet axis is extended, is uniformly spaced with respect to the wall of the piston cavity.

In accordance with an example embodiment of the present invention, the outer fuel jets of the spray cloud penetrate the combustion chamber to a greater depth than the inner fuel jets. This allows the form of the fuel cone to be adapted to the geometry of the piston cavity in an advantageous manner.

In an example embodiment of the fuel injector according to the present invention, the diameters of the spray-discharge orifices of the inner fuel jets are smaller than the diameters of the spray-discharge orifices of the outer fuel jets, and/or the spray-discharge orifices of the inner fuel jets widen in the discharge direction in the discharge-side region, and/or the fuel pressure applied at the spray-discharge orifice of the inner fuel jets is reduced by structural measures. This allows the penetration depth of the inner fuel jets to be reduced by simple measures.

The fuel injector advantageously injects centrally into the center of the combustion chamber. This provides access to the entire combustion-chamber air.

The fuel injector may have 20 to 40 spray-discharge orifices. This has the advantage that the penetration depth of the fuel envelope and the individual fuel jets is considerably reduced, and the surface of the fuel spray that is in contact with the combustion air via the shear contact surface is advantageously increased.

In an example embodiment, the spread angle between the fuel jets is 15° to 25°, e.g., 20°. This allows an optimal homogenization of the fuel with the combustion air.

DETAILED DESCRIPTION

Figure 1:
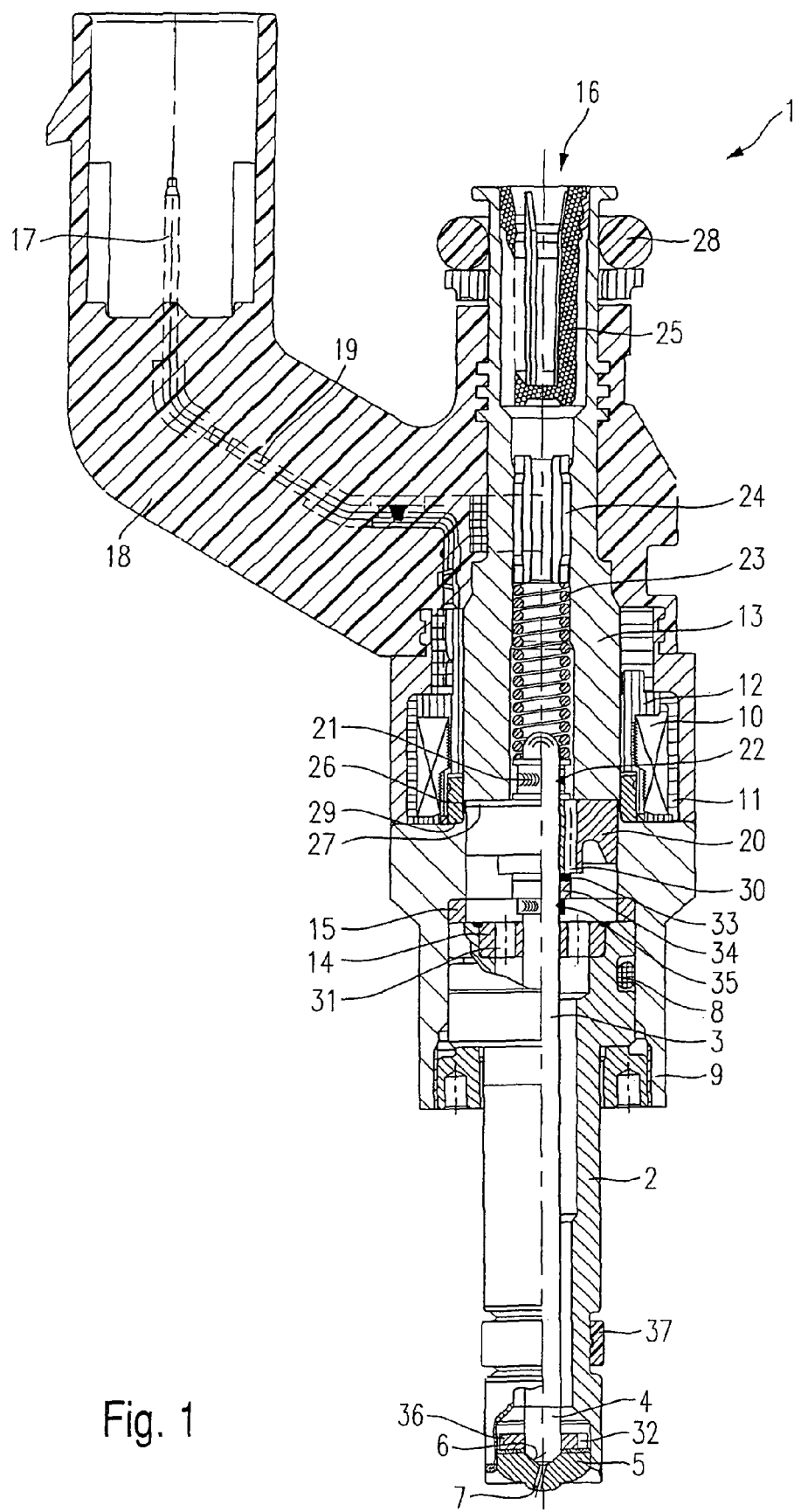
FIG. 1 is a schematic cross-sectional view of an example of a generic fuel injector.

In the following, example embodiments of the present invention are described, with identical components having been provided with identical reference numerals in the figures.

Before providing a detailed description of example embodiments according to the present invention, in order to provide a better understanding of the present invention, a generic fuel injector shall be first explained briefly with reference to FIG. 1.

An example of a generic fuel injector 1, shown in FIG. 1, is for fuel-injection systems of mixture-compressing internal combustion engines having externally supplied ignition. Fuel injector 1 is suited, in particular, for the direct injection of fuel into a combustion chamber (not shown) of an internal combustion engine.

Fuel injector 1 includes of a nozzle body 2 in which a valve needle 3 is positioned. Valve needle 3 has a valve-closure member 4 on its discharge side, which cooperates with a valve-seat surface 6 disposed on a valve-seat member 5 to form a sealing seat. In the embodiment shown, fuel injector 1 is an inwardly opening fuel injector 1, which has a spray orifice 7. A seal 8 seals nozzle body 2 against an outer pole 9 of a solenoid coil 10. Solenoid coil 10 is encapsulated in a coil housing 11 and wound on a coil brace 12 which rests against an inner pole 13 of solenoid coil 10. Inner pole 13 and outer pole 9 are separated from one another by spacing 26 and interconnected by a non-ferromagnetic connecting part 29. Solenoid coil 10 is energized via an electric line 19 by an electric current, which may be supplied via an electrical plug contact 17. Plug contact 17 is enclosed by a plastic coat 18, which is extrudable onto inner pole 13.

Valve needle 3 is guided in a valve-needle guide 14, which is disk-shaped. A paired adjustment disk 15 is used to adjust the (valve) lift. Armature 20 is disposed on the other side of adjustment disk 15. Via a first flange 21, the armature is in connection to valve needle 3, which is joined to first flange 21 by a welded seam 22. A helical restoring spring 23 is braced on first flange 21 and prestressed by a sleeve 24 in the present design of fuel injector 1.

Fuel channels 30, 31 and 32 extend in valve-needle guide 14, armature 20 and along a guide element 36. The fuel is supplied via a central fuel supply 16 and filtered by a filter element 25. A rubber ring 28 seals fuel injector 1 against a fuel distributor line (not shown further), and a seal 37 seals it against a cylinder head (not shown further).

On the spray-discharge side of armature 20 is an annular damping element 33 made of an elastomeric material. It rests on a second flange 34, which is integrally joined to valve needle 3 via a welded seam 35.

In the quiescent state of fuel injector 1, armature 20 is acted upon by a restoring spring 23 against its direction of lift, in such a way that valve-closure member 4 is held in sealing contact on valve-seat surface 6. When excited, solenoid coil 10 generates a magnetic field which moves armature 20 in the lift direction, counter to the spring force of restoring spring 23, the lift being defined by a working gap 27 occurring in the rest position between inner pole 12 and armature 20. First flange 21, which is welded to valve needle 3, is taken along by armature 20, in the lift direction as well. Valve-closure member 4, which is connected to valve needle 3, lifts off from valve seat surface 6, so that the fuel supplied under pressure is spray-discharged into the combustion chamber (not shown) through spray-discharge orifice 7.

If the coil current is interrupted, following sufficient decay of the magnetic field, armature 20 falls away from inner pole 13 due to the pressure of restoring spring 23, whereupon first flange 21, being connected to valve needle 3, moves in a direction counter to the lift direction. Valve needle 3 is thereby moved in the same direction, causing valve-closure member 4 to set down on valve seat surface 6 and fuel injector 1 to be closed.

Figure 2:
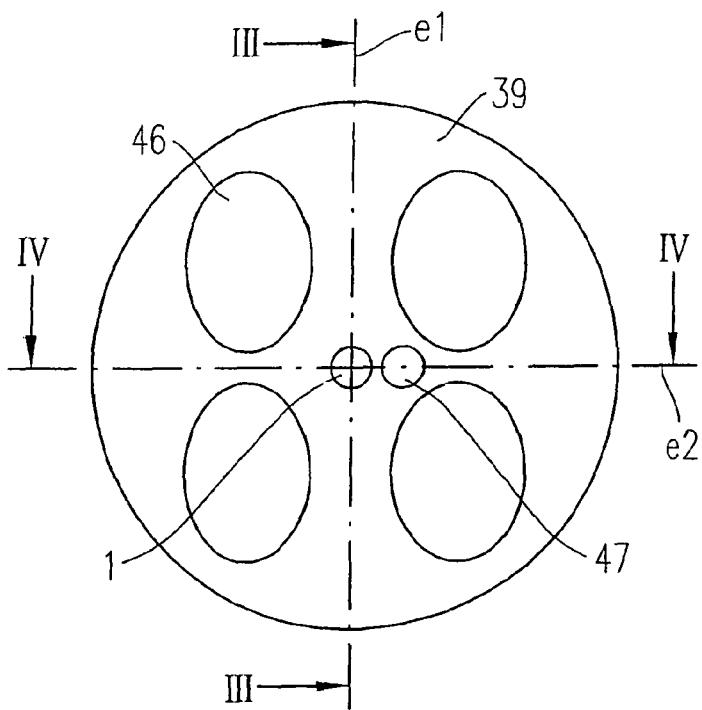
FIG. 2 shows an example of an arrangement of a fuel injector in a combustion-chamber top of a fuel injection system according to the present invention.

FIG. 2 shows an example embodiment of an arrangement of a fuel injector 1 in a combustion-chamber top 39 of a fuel injection system according to the present invention, fuel injector 1 being centrically disposed in combustion-chamber top 39. Combustion-chamber top 39, together with a cylinder (not shown further) and a piston 40 shown in FIGS. 3, 4 and 7, delimits a combustion chamber 38. Combustion-chamber top 39, which is shown from the direction of combustion chamber 38, has four valves 46 which are provided for the gas exchange. A spark plug 47 projects into combustion chamber 38 only a short distance away from fuel injector 1. A first plane e1 and a second plane e2 intersect combustion chamber 38 and the discharge-side end of fuel injector 1 according to the present invention, second plane e2 extending perpendicular to first plane e2 and intersecting it.

Figure 3:
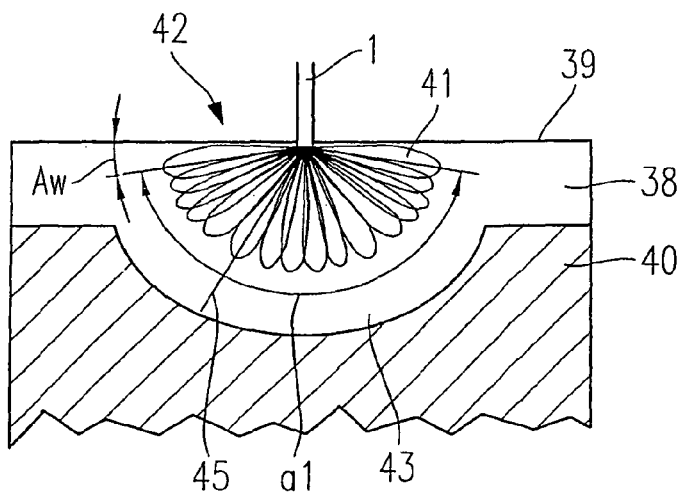
FIG. 3 shows a schematic representation of a spray cloud generated by a first example embodiment of the fuel injector used according to the present invention, viewed in the context of a cross section taken along line III-III in FIG. 2.

FIG. 3, in a cross section view of first plane e1 taken along line III-III in FIG. 2, shows a schematic representation of a spray cloud 42 generated by a first example embodiment of fuel injector 1 of a fuel-injection system according to the present invention. Spray cloud 42, which is defined by, for example, forty fuel jets 41, has the form of a circular segment in a cross section along first plane e1. All fuel jets 41 penetrate combustion chamber 38 to the same depth. Spray cloud 42 is coaxially disposed in combustion chamber 38. Combustion-chamber top 39 has a rectangular extension in a cross section of first plane e1. In the direction of combustion-chamber top 39, spray cloud 42 has a uniform clearance angle Aw. In the cross section of first plane e1, spray cloud 42 opens up at a first opening angle a1, which is greater than a second opening angle a2 shown in FIG. 4.

Piston 40 has a piston cavity 43 that has the form of a circular segment in a cross section of first plane e1, piston cavity 43 being centrically positioned in piston 40. Each fuel jet 41 has a jet axis 45. Depending on the position of piston 40 during the injection process, a portion of, or all, fuel jets 41, when extended along their jet axes 45, are directed toward the surface of piston cavity 43. The distances of the ends of fuel jets 41 with respect to the surface of piston cavity 43 are identical when extended along their jet axes 45.

Figure 4:
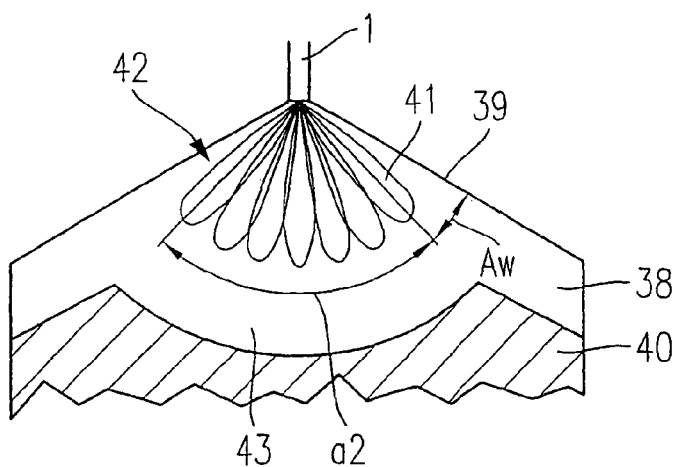
FIG. 4 shows a schematic representation of a spray cloud generated by the first example embodiment of the fuel injector used according to the present invention, viewed in the context of a cross section taken along line IV-IV in FIG. 2.

FIG. 4 shows a schematic representation of spray cloud 42 generated by the first example embodiment of fuel injector 1 of the fuel-injection system according to the present invention, in a cross section of second plane e2 along the line IV-IV in FIG. 2. Second opening angle a2 is considerably smaller than first opening angle a1 shown in FIG. 3, clearance angle Aw having the same size as clearance angle Aw shown in FIG. 3. In the perspective shown here in FIG. 4, which is perpendicular to second plane e2, combustion-chamber top 39 widens conically, facing away from fuel injector 1.

Figure 5:
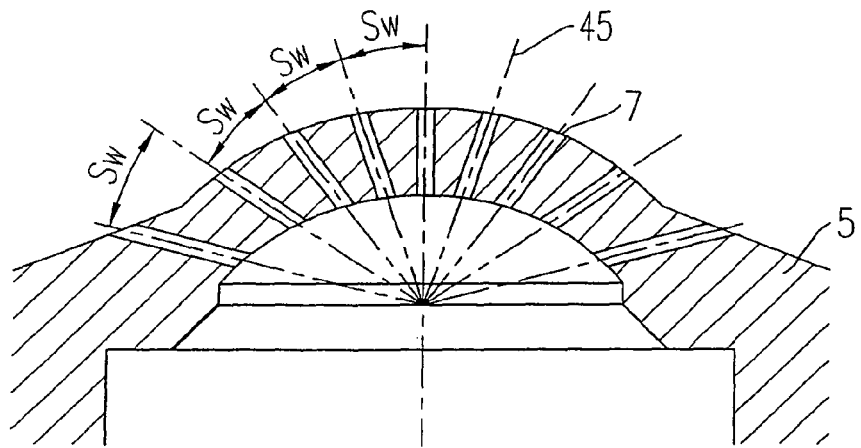
FIG. 5 is a schematic cross-sectional view of the valve body of the first example embodiment of the fuel injector used according to the present invention, viewed in the context of a cross section taken along line III-III in FIG. 2.

FIG. 5 shows a schematic section through valve-seat body 5 of the first example embodiment of fuel injector 1 of the fuel-injection system according to the present invention, in a cross section of first plane e1 along the line III-III in FIG. 2. The nine spray-discharge orifices 7 lying along first plane e1 have a mutual spread angle Sw of 20°, for instance.

Figure 6:
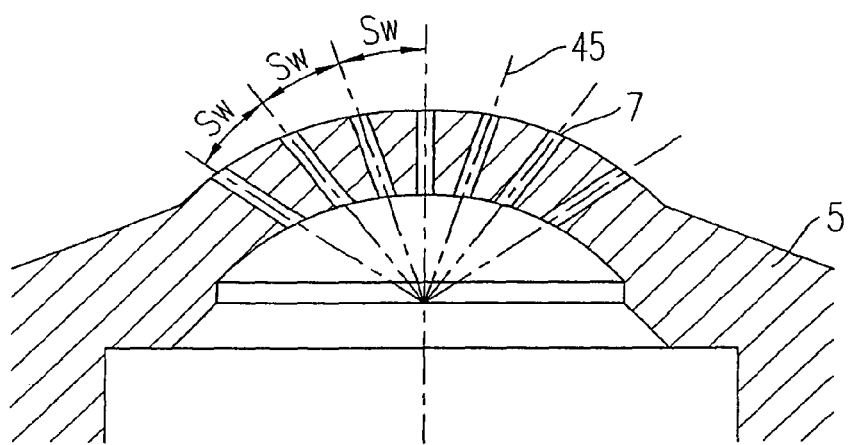
FIG. 6 is a schematic cross-sectional view of the valve body of the first example embodiment of the fuel injector used according to the present invention, viewed in the context of a cross section taken along line IV-IV in FIG. 2.

FIG. 6 shows a schematic section through valve-seat body 5 of the first example embodiment of fuel injector 1 of the fuel-injection system according to the present invention, in a cross section of second plane e1 along the line IV-IV in FIG. 2. The seven spray-discharge orifices 7 lying along second plane e2 also have a mutual spread angle Sw of 20°. Since the number of spray-discharge orifices 7 lying in second plane e2 is smaller than the number of spray-discharge orifices 7 in first plane e1, second opening angle a2 is considerably smaller than first opening angle a1.

Figure 7:
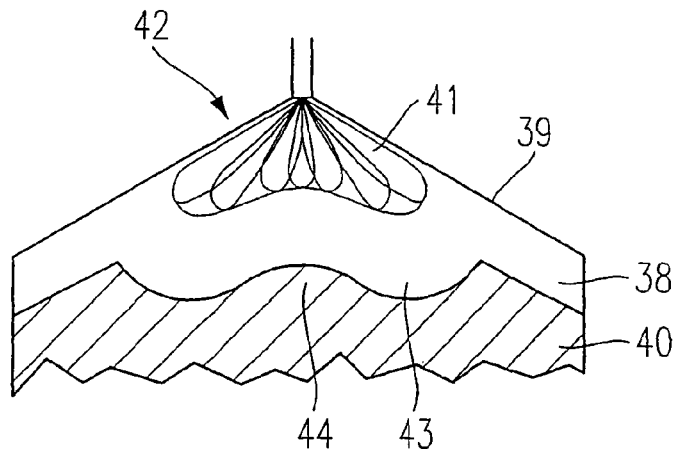
FIG. 7 shows a schematic representation of a spray cloud generated by a second example embodiment of a fuel injector used according to the present invention, viewed in the context of a cross section taken along line IV-IV in FIG. 2.

FIG. 7 shows a schematic representation of a spray cloud 42, generated by a second example embodiment of a fuel injector 1 of a fuel-injection system according to the present invention, in a cross section of second plane e2 along line IV-IV in FIG. 2. Piston cavity 43 has a wave-shaped projection 44, which is disposed in piston cavity 43 in a centered manner. Fuel jets 41 arranged in the center of spray cloud 42 penetrate combustion chamber 38 less deeply than outer fuel jets 41. The form of spray cloud 42 thus is adapted to the form of piston cavity 43, so that all fuel jets directed toward piston cavity 43 observe the same spacing with respect to piston cavity 43. Spray-discharge orifices 7 of inner fuel jets 41 are reduced in diameter and/or conically widen in the discharge-side region compared to spray-discharge orifices 7 of outer fuel jets 41. It is also possible, for instance, that the pressure of the fuel applied at spray-discharge orifice 7 of the inner fuel jets is reduced by structural measures.

In this example embodiment, the surface of piston 40 facing toward combustion chamber 38 conically slants downward from the outer edge of piston cavity 43 in the discharge direction.

The present invention is not limited to the illustrated example embodiments, and the features of the example embodiments may be combined with each other as desired.

What is claimed is:

1. A fuel-injection system for direct injection of fuel into a combustion chamber through a combustion-chamber top located opposite from a piston, comprising:
    a fuel injector having a plurality of spray-discharge orifices discharging a corresponding plurality of fuel jets, wherein the plurality of fuel jets form a spray cloud in the combustion chamber;
    wherein a first opening angle of the spray cloud along a first cross-sectional plane bisecting the longitudinal axis of the fuel injector is greater than a second opening angle of the spray cloud along a second cross-sectional plane bisecting the longitudinal axis of the fuel injector, the second cross-sectional plane extending perpendicular to the first cross-sectional plane, and
    wherein the first opening angle of the spray cloud along the first cross-sectional plane bisecting the longitudinal axis of the fuel injector and the second opening angle of the spray cloud along the second cross-sectional plane bisecting the longitudinal axis of the fuel injector are symmetrical about the longitudinal axis of the fuel injector.

2. The fuel-injection system as recited in claim 1, wherein the spray cloud is formed in the combustion chamber with a clearance angle between the combustion-chamber top and the spray cloud, and wherein the clearance angle is uniform along the circumference of the spray cloud.

3. The fuel-injection system as recited in claim 2, wherein the combustion-chamber top conically widens from the fuel injector along the second cross-sectional plane bisecting the longitudinal axis of the fuel injector, and wherein the combustion-chamber top widens from the fuel injector along the first cross-sectional plane bisecting the longitudinal axis of the fuel injector at a greater gradient than along the second cross-sectional plane.

4. The fuel-injection system as recited in claim 3, wherein the plurality of fuel jets is injected in the direction of a cavity in the piston.

5. The fuel-injection system as recited in claim 4, wherein the surface of the piston cavity has at least one projection.

6. The fuel-injection system as recited in claim 5, wherein the at least one projection is centrally positioned in the piston cavity.

7. The fuel-injection system as recited in claim 4, wherein the plurality of fuel jets injected into the piston cavity has substantially identical spacing with respect to the surface of the piston cavity.

8. The fuel-injection system as recited in claim 4, wherein inner fuel jets located in the center region of the spray cloud extend into the combustion chamber to a lesser depth than outer fuel jets of the spray cloud.

9. The fuel-injection system as recited in claim 8, wherein at least one of: a) diameters of the spray-discharge orifices corresponding to the inner fuel jets are smaller than diameters of the spray-discharge orifices corresponding to the outer fuel jets; b) diameters of the spray-discharge orifices corresponding to the inner fuel jets widen in the discharge-side region; and c) the fuel pressure applied to the spray-discharge orifices corresponding to the inner fuel jets is reduced by upstream structural units.

10. The fuel-injection system as recited in claim 4, wherein the fuel injector is located in the center of the combustion-chamber top.

11. The fuel-injection system as recited in claim 4, wherein the fuel injector has 20 to 40 spray-discharge orifices.

12. The fuel-injection system as recited in claim 4, wherein the spray-discharge orifices have a spread angle of approximately 15° to 25° relative to each other.

13. A fuel-injection system for direct injection of fuel into a combustion chamber through a combustion-chamber top located opposite from a piston, comprising:
    a fuel injector having a plurality of spray-discharge orifices discharging a corresponding plurality of fuel jets, wherein the plurality of fuel jets form a spray cloud in the combustion chamber;
    wherein a first opening angle of the spray cloud along a first cross-sectional plane bisecting the longitudinal axis of the fuel injector is greater than a second opening angle of the spray cloud along a second cross-sectional plane bisecting the longitudinal axis of the fuel injector, the second cross-sectional plane extending perpendicular to the first cross-sectional plane,
    wherein the spray cloud is formed in the combustion chamber with a clearance angle between the combustion-chamber top and the spray cloud,
    wherein the clearance angle is uniform along the circumference of the spray cloud, wherein the combustion-chamber top conically widens from the fuel injector along the second cross-sectional plane bisecting the longitudinal axis of the fuel injector,
    wherein the combustion-chamber top widens from the fuel injector along the first cross-sectional plane bisecting the longitudinal axis of the fuel injector at a greater gradient than along the second cross-sectional plane,
    wherein the plurality of fuel jets is injected in the direction of a cavity in the piston, wherein the surface of the piston cavity has at least one projection,
    wherein the at least one projection is centrally positioned in the piston cavity,
    wherein the plurality of fuel jets injected into the piston cavity has substantially identical spacing with respect to the surface of the piston cavity, and
    wherein inner fuel jets located in the center region of the spray cloud extend into the combustion chamber to a lesser depth than outer fuel jets of the spray cloud.

14. The fuel-injection system as recited in claim 13, wherein diameters of the spray-discharge orifices corresponding to the inner fuel jets are smaller than diameters of the spray-discharge orifices corresponding to the outer fuel jets.

15. The fuel-injection system as recited in claim 13, wherein diameters of the spray-discharge orifices corresponding to the inner fuel jets widen in the discharge-side region is reduced by upstream structural units.

16. The fuel-injection system as recited in claim 13, wherein the fuel pressure applied to the spray-discharge orifices corresponding to the inner fuel jets is reduced by upstream structural units.

17. The fuel-injection system as recited in claim 4, wherein the fuel injector is located in the center of the combustion-chamber top, wherein the fuel injector has 20 to 40 spray-discharge orifices, and wherein the spray-discharge orifices have a spread angle of approximately 15° to 25° relative to each other.

* * * * *